United States Patent [19]

Debono

[11] 4,029,769

[45] June 14, 1977

[54] ANTIBIOTIC A-35512B AGLYCONE

[75] Inventor: Manuel Debono, Indianapolis, Ind.

[73] Assignee: Eli Lilly and Company, Indianapolis, Ind.

[22] Filed: May 24, 1976

[21] Appl. No.: 689,273

[52] U.S. Cl. .............................. 424/118; 195/80 R
[51] Int. Cl.$^2$ ....................................... A61K 35/74
[58] Field of Search ................... 424/118; 195/80 R

[56] References Cited

UNITED STATES PATENTS

| | | | |
|---|---|---|---|
| 3,969,501 | 7/1976 | Shoji et al. | 424/118 |
| 3,969,515 | 7/1976 | Argoudelis et al. | 424/118 |

*Primary Examiner*—Jerome D. Goldberg
*Attorney, Agent, or Firm*—Nancy J. Harrison; Everet F. Smith

[57] ABSTRACT

Antibiotic A-35512B aglycone, prepared from A-35512 factor B by acid hydrolysis, is a useful antibacterial agent.

2 Claims, 1 Drawing Figure

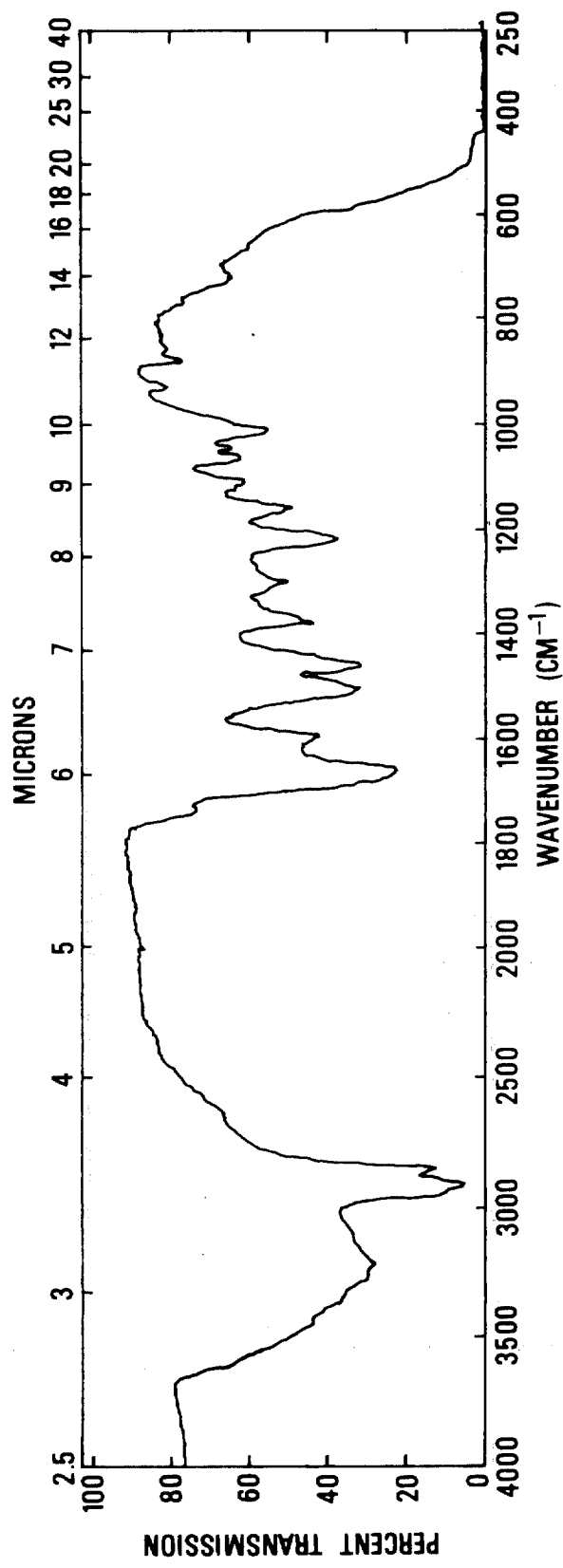

ANTIBIOTIC A-35512B AGLYCONE

SUMMARY OF THE INVENTION

The A-35512 antibiotics are closely related, glycopeptide antibiotics. A-35512 factor B is the major component of the A-35512 antibiotic complex. The A-35512 antibiotics, including A-35512 factor B, are described in the co-pending application of Michel and Higgens titled ANTIBIOTIC A-35512 AND PROCESS FOR PRODUCTION THEREOF, Ser. No. 689,274, filed herewith this even date. The A-35512 complex is produced by culturing a novel strain of *Streptomyces candidus*, NRRL 8156, under submerged aerobic fermentation conditions until a substantial level of antibiotic activity is produced. The A-35512 complex can be separated from the filtered fermentation broth by absorption on a resin column, elution of the column with an aqueous alcohol solution, and evaporation of the eluates to obtain the A-35512 complex. A-33512 factor B can be separated from the complex and further purified by chromatography. A-35512 factor B occurs in the A-35512 complex and is recovered from the complex in the form of a dihydrochloride salt. The novel compound of this invention is produced from A-35512 factor B dihydrochloride by mild acid hydrolysis. Mild acid hydrolysis removes glucose, fucose, mannose, and rhamnose from A-35512 factor B. The novel compound of this invention, therefore, is arbitrarily designated herein as A-35512B aglycone.

A-35512B aglycone is recovered from the hydrolysis reaction in the form of a hydrochloride. A-35512B aglycone hydrochloride may be converted to its free base (ionic chlorine free) form by, for example, treatment with an ion-exchange resin. In addition to the free base and dihydrochloride form, other pharmaceutically-acceptable salts of A-35512B aglycone are also useful.

DESCRIPTION OF THE DRAWINGS

The infrared absorption spectrum of A-35512B aglycone hydrochloride in Nujol mull is presented in the accompanying drawing.

DETAILED DESCRIPTION OF THE INVENTION

The following paragraphs describe the physical and spectral properties of A-35512B aglycone.

A-35512B Aglycone

A-35512B aglycone hydrochloride is a white amorphous compound having the following approximate percentage elemental composition:

Carbon, 54.29%; hydrogen, 4.34%; nitrogen, 7.40%; chlorine, 5.02%; oxygen, 28.95% (by difference).

The infrared absorption spectrum of A-35512B aglycone hydrochloride in Nujol mull is shown in the accompanying drawing. The most significant absorption peaks occur at the following frequencies (cm$^{-1}$): 3440 (shoulder), 3340 (shoulder), 3215 (strong), 2950 (shoulder), 2910 (strong), 2840 (strong), 2640 (shoulder), 1735 (weak), 1655 (strong), 1590 (medium), 1500 (strong), 1460 (strong), 1378 (medium, 1365 (shoulder), 1298 (medium), 1215 (medium), 1155 (medium), 1120 (shoulder), 1105, (weak), 1060 (weak), 1040 (weak), 1008 (medium), 925 (weak), 875 (weak), 765 (shoulder), and 718 (weak).

Electrometric titration of A-35512B aglycone hydrochloride in 66 percent aqueous dimethylformamide indicates the presence of three titratable groups with $pK_a$ values of approximately 7.5, 9.25, and 11.0 and the possible presence of two additional groups with $pK_a$ values greater than 11.0.

A-35512B aglycone hydrochloride has a molecular weight of about 1282, as determined by titration.

A-35512B aglycone hydrochloride has the following specific rotations:

$[\alpha]_D^{25}$ −178° (c 5, CH$_3$OH)

$[\alpha]_{365}^{25}$ −716.8° (c 5, CH$_3$OH)

The ultraviolet absorption spectra of A-35512B aglycone hydrochloride show, in acidic and neutral methanol, an absorption maximum at 282 nm ($E_{1cm}^{1\%}$ 102.62) and, in basic methanol, an absorption maximum at 302 nm ($E_{1cm}^{1\%}$ 182.09).

A $^{13}$C nuclear-magnetic-resonance spectrum of A-35512B aglycone in DMSO-d$_6$ at 90° C. has the following characteristics:

| No. | PPM | Height (%) |
| --- | --- | --- |
| 1 | 187.8 | 37.2 |
| 2 | 172.0 | 40.9 |
| 3 | 170.7 | 45.2 |
| 4 | 170.1 | 46.9 |
| 5 | 169.6 | 47.7 |
| 6 | 168.4 | 57.6 |
| 7 | 166.7 | 52.5 |
| 8 | 157.4 | 49.9 |
| 9 | 156.6 | 45.5 |
| 10 | 155.7 | 55.8 |
| 11 | 155.6 | 71.5 |
| 12 | 155.4 | 56.7 |
| 13 | 154.5 | 50.5 |
| 14 | 149.3 | 43.0 |
| 15 | 138.8 | 38.8 |
| 16 | 136.9 | 54.3 |
| 17 | 136.3 | 40.2 |
| 18 | 135.2 | 31.7 |
| 19 | 134.7 | 28.4 |
| 20 | 133.8 | 40.9 |
| 21 | 128.2 | 102.9 |
| 22 | 126.2 | 77.2 |
| 23 | 123.0 | 57.5 |
| 24 | 121.3 | 38.1 |
| 25 | 117.7 | 44.4 |
| 26 | 117.0 | 31.5 |
| 27 | 108.6 | 31.0 |
| 28 | 106.7 | 47.9 |
| 29 | 105.7 | 81.2 |
| 30 | 103.2 | 26.5 |
| 31 | 93.6 | 33.4 |
| 32 | 74.9 | 39.8 |
| 33 | 71.8 | 33.9 |
| 34 | 68.9 | 40.2 |
| 35 | 63.2 | 43.1 |
| 36 | 60.4 | 33.6 |
| 37 | 57.1 | 57.8 |
| 38 | 55.2 | 33.1 |
| 39 | 53.2 | 30.1 |
| 40 | 51.8 | 36.0 |
| 41 | 40.7 | 43.4* |
| 42 | 39.9 | 60.9* |
| 43 | 39.1 | 43.9* |
| 44 | 23.8 | 55.7 |
| 45 | 17.1 | 47.8 |
| 46 | 0.0 | 43.7 |

*DMO-d$_6$

The $^{13}$C nmr spectrum indicates that A-35512B aglycone continues to retain the 3-amino-2,3,6-trideoxy-3-C-methyl-L-xylo-hexopyranose moiety (one of the sugars present in A-35512 factor B).

Amino-acid analysis of further-acid-hydrolyzed A-35512B aglycone hydrochloride indicates that A-35512B aglycone contains glycine and at least three complex amino-acid residues. The structure of one of these amino-acid residues appears to be:

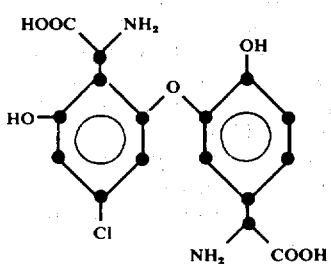

A-35512 aglycone hydrochloride is soluble in water and methanol, but is insoluble in less polar organic solvents such as benzene, chloroform, acetone, diethyl ether, ethyl acetate, toluene, hexane, acetonitrile and dioxane.

A-35512B aglycone hydrochloride has an approximate $R_f$ value of 0.80 on cellulose thin-layer chromatography (aluminum support), using a 1-butanol:-pyridine:acetic acid:water (15:10:3:12) solvent system. Bioautography, using *Sarcina lutea*, is a preferred detection method.

A-35512B aglycone hydrochloride has an approximate $R_f$ value of 0.26 on silica gel thin-layer chromatography using a methanol:chloroform:conc. $NH_4OH$ (3:2:1) solvent system.

A-35512B aglycone (free base) is a white amorphous compound having the following approximate percentage elemental composition (average):

Carbon, 52.65%; Hydrogen, 4.57%; Nitrogen, 6.91%;
Chlorine, 2.94%; Oxygen, 27.04%; Ash, 4.70%.

The infrared absorption spectrum of A-35512B aglycone (free base) in KBr pellet exhibits significant absorption peaks at the following frequencies ($cm^{-1}$): 3360 (strong), 3260 (shoulder), 2940 (shoulder), 1735 (shoulder), 1660 (strong), 1598 (medium), 1510 (strong), 1440 (medium), 1295 (weak), 1215 (medium), 1165 (medium), 1122 (weak), 1070 (weak), 1018 (strong), 940 (weak), and 920 (weak).

Electrometric titration of A-35512B aglycone (free base) in 66% aqueous dimethylformamide indicates the presence of five titratable groups with $pK_a$ values of approximately 6.2, 8.2, 10.1, 11.4, and 12.4 and the possible presence of one or two additional groups with $pK_a$ values greater than 12.5.

A-35512B aglycone (free base) has the following specific rotation:

$[\alpha]_D^{25}$ −64.5° (c 3, DMSO).

The ultraviolet absorption spectra of A-35512B aglycone (free base) show, in neutral and acidic methanol, an absorption maximum at 282 nm ($E_{1cm}^{1\%}$ 43.65) and, in basic methanol, an absorption maximum at 301 nm ($E_{1cm}^{1\%}$ 67.46).

A-35512B aglycone (free base) has the same approximate $R_f$ values earlier-described for A-35512B aglycone hydrochloride.

In addition to the free base and hydrochloride forms of A-35512B aglycone, other pharmaceutically-acceptable acid-addition salts of A-35512B aglycone are also part of this invention. "Pharmaceutically-acceptable" salts are salts in which the toxicity of the compound as a whole toward warm-blooded animals is not increased relative to the non-salt form. Representative and suitable salts of A-35512B aglycone include those salts formed by standard reaction with both organic and inorganic acids such as, for example, sulfuric, phosphoric, acetic, succinic, citric, lactic, maleic, fumaric, palmitic, cholic, pamoic, mucic, D-glutamic, d-camphoric, glutaric, glycolic phthalic, tartaric, lauric, stearic, salicylic, methanesulfonic, benzenesulfonic, sorbic, picric, benzoic, cinnamic and like acids.

A-35512B aglycone hydrochloride is prepared by mild acid hydrolysis of A-35512 factor B dihydrochloride. The following paragraphs describe the physical and chemical characteristics of A-35512 factor B.

A-35512 FACTOR B

A-35512 factor B is a white, amorphous, basic compound. The approximate empirical formula for A-35512 factor B is $C_{97-99}H_{101-105}N_{8-9}O_{46-48}Cl$. A-35512 factor B has the following average percentage elemental composition:

Carbon, 53.97%; hydrogen, 4.75%;
nitrogen, 5.25%; oxygen, 34.29%;
chlorine, 1.59%

This elemental composition is in particular agreement with a preferred empirical formula of $C_{98}H_{104}N_9O_{47}Cl$ (Calcd: C, 53.60; H, 4.75; N, 5.74; O, 34.30; Cl, 1.61). An alternative preferred empirical formula is $C_{98}H_{103}N_8O_{47}Cl$ (Calcd: C, 54.00; H, 4.75; N, 5.15; O, 34.50; Cl, 1.60).

The ultraviolet absorption (uv) spectra of A-35512 factor B show, in acidic and neutral methanol, an absorption maximum at 282 nm ($\epsilon$ 15000) and, in basic methanol, an absorption maximum at 292 nm ($\epsilon$ 16000), calculated using a molecular weight of 2000. The uv spectra of A-35512 factor B also show end-absorption at 225 nm.

A-35512 factor B has the following specific rotations:
$[\alpha]_D^{25}$ −123° (c 1, $H_2O$)
$[\alpha]_{365}^{25}$ −446° (c 1, $H_2O$)

Electrometric titration of A-35512 factor B in 66 percent aqueous dimethylformamide indicates the presence of four titratable groups with $pK_a$ values of approximately 7.15, 8.81, 10.20, 12.00 and the possible presence of another group with a $pK_a$ value greater than 13.50.

The apparent molecular weight of A-35512 factor B, as determined by titration, is about 2143.

A-35512 factor B dihydrochloride is a white crystalline compound (from 50 percent aqueous methanol). Although A-35512 factor B dihydrochloride is hygroscopic and does not exhibit a distinct melting point, a thermogram showed weight loss beginning at 25° C., resulting in a 7.4 percent loss at 121° C.; at 135° C. another loss occurred, resulting in decomposition.

A-35512 factor B dihydrochloride has the following approximate percentage elemental composition (average):

Carbon, 52.57%; hydrogen, 4.80%;
nitrogen, 5.66%; oxygen, 32.86%;
chlorine, 4.51%

This elemental composition is in particular agreement with another alternative empirical formula of $C_{98}H_{103}N_9O_{47}Cl \cdot 2HCl$ (Calcd: C, 51.93; H, 4.65; N, 5.57; O, 33.20; Cl, 4.65).

The infrared absorption spectrum of A-35512 factor B dihydrochloride in KBr pellet exhibits significant absorption maxima at the following frequencies ($cm^{-1}$): 3420 (strong), 3300 (shoulder), 2950 (weak), 1752 (weak), 1675 (strong), 1630 (shoulder), 1605 (strong), 1520 (strong), 1470 (weak), 1440 (weak), 1410 (weak), 1345 (shoulder), 1312 (medium), 1225

(medium), 1180 (weak), 1135 (weak), 1080 (strong), and 1020 (weak).

The uv spectra of A-35512 factor B dihydrochloride show, in acidic and neutral methanol, an absorption maximum at 282 nm ($\epsilon$ 12,000) and, in basic methanol, an absorption maximum at 292 nm ($\epsilon$ 14,000), calculated using a molecular weight of 2000. The uv spectra of A-35512 factor B dihydrochloride also show end-absorption at 225 nm.

A-35512 factor B dihydrochloride has the following specific rotations:

$[\alpha]_D^{25} -128°$ (c 1, $H_2O$)
$[\alpha]_{365}^{25} -475°$ (c 1, $H_2O$)

Electrometric titration of A-35512 factor B dihydrochloride in 66 percent aqueous dimethylformamide indicates the presence of four titratable groups with $pK_a$ values of approximately 7.15, 8.87, 10.30, and 12.10 and the possible presence of another group with a $pK_a$ greater than 13.1.

The apparent molecular weight of A-35512 factor B dihydrochloride, as determined by titration, is about 2027.

A $^{13}C$ nuclear-magnetic-resonance spectrum of A-35512 factor B dihydrochloride in $D_2O$ has the following characteristics:

| NO. | PPM | Height (%) |
| --- | --- | --- |
| 2 | 173.0 | 4.1 |
| 3 | 171.9 | 3.7 |
| 4 | 171.6 | 3.3 |
| 5 | 171.0 | 5.8 |
| 6 | 170.8 | 5.0 |
| 7 | 169.6 | 3.6 |
| 8 | 159.0 | 4.1 |
| 9 | 157.9 | 4.4 |
| 10 | 157.5 | 3.7 |
| 11 | 156.6 | 4.8 |
| 12 | 155.6 | 6.1 |
| 13 | 155.3 | 4.2 |
| 14 | 154.9 | 3.3 |
| 15 | 154.3 | 4.2 |
| 16 | 151.7 | 3.3 |
| 17 | 144.3 | 3.1 |
| 18 | 136.7 | 3.5 |
| 19 | 136.2 | 4.9 |
| 20 | 135.4 | 4.0 |
| 21 | 135.2 | 4.4 |
| 22 | 133.6 | 4.2 |
| 23 | 133.3 | 4.1 |
| 24 | 129.8 | 1.7 |
| 25 | 129.3 | 3.0 |
| 26 | 128.8 | 2.6 |
| 27 | 127.6 | 1.5 |
| 28 | 126.1 | 3.9 |
| 29 | 124.2 | 5.6 |
| 30 | 122.4 | 1.4 |
| 31 | 122.0 | 4.4 |
| 32 | 120.7 | 3.3 |
| 33 | 116.5 | 2.7 |
| 34 | 109.5 | 0.8 |
| 35 | 108.2 | 1.1 |
| 36 | 107.7 | 2.7 |
| 37 | 104.5 | 1.7 |
| 38 | 101.8 | 2.9 |
| 39 | 100.9 | 1.6 |
| 40 | 98.2 | 1.0 |
| 41 | 76.9 | 1.2 |
| 42 | 76.1 | 1.8 |
| 43 | 74.1 | 2.0 |
| 44 | 73.5 | 2.7 |
| 45 | 72.7 | 2.4 |
| 46 | 72.3 | 4.0 |
| 47 | 71.0 | 7.1 |
| 48 | 70.3 | 2.5 |
| 49 | 69.7 | 2.5 |
| 50 | 67.4 | 74.7* |
| 51 | 64.6 | 1.2 |
| 52 | 62.0 | 1.5 |
| 53 | 58.0 | 1.3 |
| 54 | 56.8 | 1.7 |
| 55 | 55.4 | 3.9 |
| 56 | 54.3 | 2.5 |
| 57 | 24.5 | 2.0 |
| 58 | 17.9 | 3.0 |

-continued

| NO. | PPM | Height (%) |
| --- | --- | --- |
| 59 | 17.2 | 2.0 |
| 60 | 16.3 | 2.5 |

*dioxane standard

A-35512 factor B dihydrochloride, crystallized from methanol-water, has the following characteristic X-ray powder diffraction pattern ($Cu^{++}$ radiation, 1.5405 $\lambda$, nickel filter, $d =$ interplanar spacing in angstroms):

| d | Relative Intensity |
| --- | --- |
| 17.15 | 100 |
| 12.90 | 80 |
| 10.85 | 70 |
| 9.25 | 70 |
| 8.87 | 60 |
| 8.22 | 50 |
| 7.86 | 50 |
| 6.93 | 40 |
| 6.20 | 40 |
| 5.62 | 40 |
| 5.04 | 05 |
| 4.02 | 02 |
| 3.54 | 02 |

Amino-acid analysis of acid-hydrolyzed A-35512 factor B dihydrochloride indicates that A-35512 factor B contains at least five amino-acid residues, one of which is glycine.

Analyses of its acid-hydrolysis products indicate that A-35512 factor B dihydrochloride contains the following sugars: glucose, fucose, mannose, rhamnose, and 3-amino-2,3,6-trideoxy-3-C-methyl-L-xylo-hexopyranose.

A-35512 factor B dihydrochloride has at least one hydroxyl group capable of esterification.

A-35512 factor B dihydrochloride is soluble in water, is partially soluble in alcohols such as methanol and ethanol, and is insoluble in other less polar organic solvents, such as benzene, chloroform, acetone, diethyl ether, ethyl acetate, toluene, hexane, acetonitrile and dioxane.

A-35512 factor B dihydrochloride is stable for as much as 72 hours in aqueous solutions having a pH of from about 3 to about 10.

A-33512 factor B is produced by culturing Streptomyces candidus NRRL 8156 under submerged aerobic conditions in a suitable culture medium until substantial antibiotic activity is produced. A-35512 factor B is recovered by various isolation and purification procedures used in the fermentation art.

The culture medium employed to grow Streptomyces candidus NRRL 8156 (Northern Regional Research Center, U.S. Department of Agriculture, Agricultural Research Service, Peoria, Illinois 61604) can be any one of a number of media. For economy in production, optimal yield, and ease of product isolation, however, certain culture media are preferred. Thus, for example, a preferred carbohydrate source in large-scale fermentation is sucrose, although glucose, tapioca dextrin, fructose, mannitol, maltose, lactose, and the like can also be employed. A preferred nitrogen source is soluble meat peptone, although soybean flour, pork-blood meal, amino acids such as glutamic acid, and the like are also useful. Among the nutrient inorganic salts which can be incorporated in the culture media are the customary soluble salts capable of yielding zinc, sodium, magnesium, calcium, ammonium, chloride, carbonate, sulfate, nitrate and like ions.

Essential trace elements necessary for the growth and development of the organism should also be included in the culture medium. Such trace elements commonly occur as impurities in other constituents of the medium in amounts sufficient to meet the growth requirements of the organism.

It may be necessary to add small amounts (i.e. 0.2 ml/l.) of an antifoam agent such as polypropylene glycol to large-scale fermentation media if foaming becomes a problem.

For production of substantial quantities of A-35512 factor B, submerged aerobic fermentation in tanks is preferred. Small quantities of A-35512 factor B may be obtained by shake-flask culture. Because of the time lag in antibiotic production commonly associated with inoculation of large tanks with the spore form of the organism, it is preferable to use a vegetative inoculum. The vegetative inoculum is prepared by inoculating a small volume of culture medium with the spore form or mycelial fragments of the organism to obtain a fresh, actively growing culture of the organism. The vegetative inoculum is then transferred to a larger tank. The A-35512-producing organism can be grown at temperatures between about 20° and about 40° C. Optimum A-35512 production appears to occur at temperatures of about 30°–34° C.

As is customary in aerobic submerged culture processes, sterile air is blown through the culture medium. For efficient growth of the organism the volume of air employed in tank production is preferably above 0.1 volume of air per volume of culture medium per minute (V/V/M). For efficient production of the A-35512 antibiotics the volume of air employed in tank production is preferably about 0.25 V/V/M.

Production of the A-35512 antibiotics, including A-35512 factor B, can be followed during fermentation by testing samples of the broth or of extracts of the mycelial solids for antibiotic activity against organisms known to be sensitive to the antibiotics. One assay organism useful in testing these antibiotics is *Bacillus subtilis* ATCC 6633. The bioassay is preferably performed by paper-disc assay on agar plates containing a nutritionally-limited medium.

Following its production under submerged aerobic fermentation conditions, A-35512 factor B can be recovered from the fermentation medium by methods employed in the fermentation art. The antibiotic activity produced during fermentation of an A-35512-producing organism generally occurs in the filtered broth. Maximum recovery of A-35512 factor B is accomplished, therefore, by an initial filtration to remove the mycelial mass. The filtered broth can be purified to give the A-35512 complex by a variety of techniques. A preferred technique involves adsorption of the filtered broth on a polyamide column and elution of the column with water and aqueous alcohol mixtures. The eluted fractions can be combined on the basis of thin-layer-chromatographic behavior to give purified A-35512 factor B.

A-35512 factors A, B, C, E, and H and minor factors F and G are conveniently separated by paper chromatography using a 1-butanol:pyridine:acetic acid:water (15:10:3:12) solvent system. Bioautography, using *Sarcina lutea*, is a preferred detection method. The approximate $R_f$ values of the A-35512 factors in this system are given in Table I.

Table I

| A-35512 Factor | $R_f$ Value |
|---|---|
| Factor A . 2HCl | 0.21 |
| Factor B . 2HCl | 0.34 |
| Factor C . 2HCl | 0.46 |
| Factor E . HCl | 0.64 |
| Factor F | 0.81 |
| Factor G | 0.93 |
| Factor H . HCl | 0.15 |

Further purification of A-35512 factor B includes additional adsorption and extraction procedures. Adsorptive materials such as alumina, silica gel, ion-exchange resins and the like can be advantageously used.

The A-35512 factors occur in the fermentation broth as hydrochlorides. The preferred polyamide separation procedure provides A-35512 factor B as a dihydrochloride.

A-35512 aglycone is prepared by mild acid hydrolysis of A-35512 factor B. A-35512 factor B is most readily available in its dihydrochloride form. A-35512 factor B dihydrochloride is, therefore, a preferred starting material for the preparation of A-35512B aglycone. A-35512 factor B or other A-35512 factor B acid-addition salts may also be used. The acid hydrolysis is carried out according to standard procedures. Although any one of a number of acids may be used, hydrochloric acid is a preferred acid for the preparation of A-35512B aglycone. When hydrochloric acid is used, the A-35512B aglycone will be recovered as a hydrochloride salt. The hydrolysis is preferably carried out in water under reflux for a period of from about one to about two hours. Longer reaction times result in degradation of the aglycone to give less active, and, later, inactive products. Optimum reaction times for specific reaction conditions can be determined by checking reaction aliquots for bioactivity.

A-35512B aglycone and its pharmaceutically-acceptable salts inhibit the growth of certain pathogenic microorganisms, particularly gram-positive bacteria.

The activity of A-35512B aglycone, as measured by conventional disc-diffusion assay (6 mm pads dipped in solutions containing 1 mg of test compound per ml of solution and placed on agar plates seeded with test organism), is summarized in Table II.

TABLE II

| Test Organism | Zone of Inhibition (mm) A-35512 aglycone (free base) |
|---|---|
| *Staphylococcus aureus* | 19 |
| *Bacillus subtilis* | 13 |
| *Sarcina lutea* | 14 |
| *Bacillus subtilis* | 22 |

*With nutritionally-limited agar

Table III summarizes minimal inhibitory concentrations (MIC's) at which A-35512B aglycone hydrochloride is active against selected *Staphylococcus aureus* strains, as determined by standard agar-dilution tests.

TABLE III

| Test Organism | MIC (mcg/ml) |
|---|---|
| *Staphylococcus aureus* 3055* | 0.5 |
| *Staphylococcus aureus* H290* | 0.5 |
| *Staphylococcus aureus* V92* | 0.5 |
| *Staphylococcus aureus* V104* | 0.25 |
| *Staphylococcus aureus* 3074** | 0.25 |

TABLE III-continued

| Test Organism | MIC (mcg/ml) |
| --- | --- |
| Staphylococcus aureus H43** | 0.5 |
| Staphylococcus aureus V57** | 0.5 |
| Staphylococcus aureus H356** | 1.0 |
| Staphylococcus aureus 3130*** | 0.5 |
| Staphylococcus aureus 3131**** | 0.5 |

*penicillin-G susceptible
**penicillin-G resistant
***penicillin-G resistant; methicillin resistant
****penicillin-G resistant; methicillin resistant; clindamycin resistant Table IV gives additional agar-dilution test results for A-35512B aglycone hydrochloride against several Group-D streptococci.

TABLE IV

| Test Organism | MIC (mcg/ml) |
| --- | --- |
| Streptococcus sp. Shrigley | 1.0 |
| Streptococcus sp. Mitis | 1.0 |
| Streptococcus sp. 12253F | 1.0 |
| Streptococcus sp. SS992 | 1.0 |
| Streptococcus sp. 9933 | 1.0 |
| Streptococcus sp. 9913 | 1.0 |
| Streptococcus sp. 282 | 1.0 |
| Streptococcus sp. 238 | 1.0 |

A-35512B aglycone has shown in vivo antibacterial activity against experimental bacterial infections. When two subcutaneous doses of A-35512B aglycone hydrochloride were administered to mice in illustrative infections, the observed activity was measured as an $ED_{50}$ value [effective dose in mg/kg to protect 50 percent of the test animals; see W. Wick, et al., J. Bacteriol. 81, 233–235 (1961)]. The $ED_{50}$ values observed for A-35512B aglycone hydrochloride are given in Table V.

TABLE V

| Test Organism | $ED_{50}$ | Infecting Challenge |
| --- | --- | --- |
| Streptococcus pyogenes C203 | 5.8 | 2570 × $LD_{50}$ (ip) |
| Streptococcus pneumoniae | 7.0 | 374 × $LD_{50}$ (ip) |
| Staphylococcus aureus 3055 | 1.04 | 370 × $LD_{50}$ (ip) |

In order to illustrate more fully the operation of this invention, the following examples are provided.

EXAMPLE 1

Preparation of A-35512 Factor B

A. Shake-flask Fermentation of A-35512

A lyophilized pellet of Streptomyces candidus NRRL 8156 was dissolved in 1–2 ml. of sterilized water. This solution was used to inoculate a Bacto yeast malt extract (ISP No. 2, Difco Laboratories, Detroit, Michigan) agar slant.

The inoculated slant was incubated at 30° C. for about seven days. The mature slant culture was covered with water (2 ml) and scraped with a sterile pipette to loosen the spores. A portion (0.1 ml) of this water suspension of spores was used to inoculate another ISP No. 2 agar slant. This inoculated slant was incubated at 30° C. for about seven days. The mature slant culture was covered with water (5 ml) and scraped with a sterile pipette to loosen the spores. A portion (2.5 ml) of the resulting suspension of spores was used to inoculate 50 ml. of a vegetative medium having the following composition:

| Ingredient | Amount |
| --- | --- |
| Trypticase Soy Broth (Baltimore Biological Laboratories, Cockeysville, Md.) | 30 g |
| Water (deionized) | q.s. 1 liter |

The inoculated vegetative medium was incubated in a 250-ml Erlenmeyer flask at 30° C. for 48 hours on a shaker rotating through an arc two inches in diameter at 250 rpm.

This incubated vegetative medium (0.5 ml) was used to inoculate 50 ml of a production medium having the following composition:

| Ingredient | Amount (g/l.) |
| --- | --- |
| Tapioca dextrin | 25.0 |
| Glucose | 10.0 |
| $NH_4NO_3$ | 2.5 |
| KCl | 1.5 |
| $MgSO_4$ | 1.1 |
| $FeCl_2 \cdot 4H_2O$ | .03 |
| $ZnCl_2$ | .03 |
| $KH_2PO_4$ | 0.1 |
| L-Glutamic acid | 1.0 |
| DL-citrulline | 0.1 |
| $CaCO_3$ | 5.0 |
| Deionized water | q.s. 1 liter |

The inoculated production medium was incubated in a 250-ml Erlenmeyer flask at 32° C. for 8–10 days on a shaker rotating through an arc two inches in diameter at 250 rpm.

B. Tank Fermentation of A-35512

In order to provide a larger volume of inoculum, 20 ml of incubated vegetative medium prepared as described above was used to inoculate 400 ml of a second-stage vegetative growth medium having the same composition as that of the vegetative medium. This second-stage medium was incubated in a 2-liter flask for 24 hours at 32° C. on a shaker rotating through an arc 2 inches in diameter at 250 rpm.

Incubated second-stage vegetative medium (800 ml) thus prepared was used to inoculate 100 liters of sterile production medium. The inoculated production medium was allowed to ferment in a 165-liter fermentation tank for about 8–10 days at a temperature of 32° C. The fermentation medium was aerated with sterile air at the rate of 0.25 V/V/M and was stirred with conventional agitators at 200 rpm.

C. Separation of A35512 Antibiotic Complex

Whole fermentation broth (250 gal.), obtained as described in Section B, was filtered, using a filter aid (Hyflo Super-cel, a diatomaceous earth, Johns-Manville Products Corp.) at broth pH (pH 6.8–7.2). The clear filtrate thus obtained was passed through a column containing 10 ml. of polymeric adsorbent (Amberlite XAD-4, Rohm and Haas Co.) per 100 ml. broth filtrate at a rate of 150 ml. per minute. Fractions thus obtained were monitored for biological activity using a standard disc assay against Sarcina lutea. The biologically inactive effluent was discarded. The column was washed with water (1/8 of the broth volume) at a rate of 150 ml. per minute. The inactive water wash was discarded.

The column was then eluted with a 50 percent aqueous methanol solution (600 liters) at a rate of 200 ml. per minute. The eluate, containing the A-35512 antibiotic complex, was concentrated under vacuum to a volume of 15 liters, containing about 200 grams at A-35512 antibiotic complex per liter.

D. Separation of A-35512 Factor B

The A-35512 antibiotic complex (about 3000 grams dissolved in 15 liters of methanol), obtained as described in Section C, was chromatographed on a polyamide column (Woelm, 100 liter). The column was eluted with deionized water at a flow rate of about 80–120 ml. per minute.

Fractions were monitored using cellulose thin-layer chromatography or paper chromatography, n-butanol: pyridine:acetic acid:water (15:10:3:12) solvent system, and *Sarcina lutea* bioautography.

The first 100 liters of eluate were discarded. The flow rate was then changed to about 160–200 ml. per minute, and 12-liter fractions were collected. Twenty fractions were collected in this manner.

At this point the eluting solvent was changed to a water-methanol gradient using the following procedure:

A container holding 360 liters of methanol was siphoned into a container holding 120 liters of water. In the water container the mixing solution was stirred and fed into the column. Twenty-four fractions (24 liters each) were collected at a flow rate of 200–300 ml/minute.

On the basis of bioautography results, groups of fractions were combined and evaporated to dryness under vacuum to give A35512 factor B dihydrochloride and the following enriched mixtures of factors:

| Fractions | Vol. (liters) | Factor(s) | Weight |
|---|---|---|---|
| 1 – 10 | 120 | A + H | 192 g. |
| 11 – 24 | 216 | B | 269 g. |
| 25 – 31 | 168 | B + C | 590 g. |
| 32 – 44 | 312 | C,E,F,G | 224 g. |

E. Purification of A-35512 Factor B

Partially purified A-35512 factor B dihydrochloride (400 g.), obtained as described in Section D, was dissolved in 1.2 liters of 50 percent aqueous methanol and chromatographed on an alumina column prepared as follows:

Acidic aluminum oxide (10 kg., M. Woelm) was stirred in a 50 percent aqueous methanol solution. After allowing the mixture to stand, the supernatant solution was decanted and discarded. The alumina was again stirred with 50 percent aqueous methanol and packed into a column having a diameter of 13.5 cm. The alumina column was washed with 50 percent aqueous methanol until a clear effluent was obtained.

The column was eluted with 50 percent aqueous methanol at a flow rate of about 8–10 ml/minute, collecting fractions having a volume of about 240–300 ml. Fractions were monitored by thin-layer bioautography as described in Section D. On the basis of this data, fractions were combined and yielded purified A-35512 factor B dihydrochloride as follows:

| Fractions | Weight |
|---|---|
| 17 – 21 | 9.6 g. |
| 22 – 29 | 72.0 g. |
| 30 – 37 | 117.0 g. |

Each of these was crystallized from a concentrated 50 percent aqueous methanol solution at 4° C. A-35512 factor B dihydrochloride thus purified contains about 4.6 percent chlorine. A solution of A-35512 factor B dihydrochloride in 66 percent aqueous dimethylformamide has a pH of about 6.5.

EXAMPLE 2

A-35512 factor B is prepared by the method of Example 1 except that the vegetative medium described in Section A is maintained in liquid nitrogen by the following procedure:

In a small (13- × 100-mm) sterilized screw-cap tube is placed in 2 ml. of a suspension agent having the following composition:

| Ingredient | Amount |
|---|---|
| Glycerol | 20% |
| Lactose | 10% |
| Water (deionized) | 70% |

To this suspension agent is added 2 ml. of a 48-hour-incubated vegetative medium prepared as described in Example 1. The mixed solution is frozen and maintained in the gas phase of a liquid-nitrogen tank.

Vegetative medium thus stored is thawed for use in shake or tank fermentation by placing the vial in a 43° C. water bath. A portion of the thawed solution (1 ml.) in the vial is used to inoculate 50 ml. of a vegetative medium having the same composition as that described in Example 1, Section A. The inoculated vegetative medium is used, as described in Example 1, either for shake-flask fermentation or to provide a larger inoculum for tank fermentation.

EXAMPLE 3

The fermentation is carried out according to the method of Example 1, but using a shake-flask/tank production medium having the following composition:

| Ingredient | Amount (g/l.) |
|---|---|
| Tapioca dextrin | 75.0 |
| Molasses | 40.0 |
| Soluble meat peptone | 15.0 |
| $MgSO_4 . 7H_2O$ | 0.5 |
| $CaCO_3$ | 2.0 |
| Water | q.s. 1 liter |

Preparation of A-35512B Aglycone

A-35512 factor B dihydrochloride (5.0 g), obtained as described in Example 1, was dissolved in water (200 ml). This solution was acidified with 4N hydrochloric acid (14 ml). The resulting solution was refluxed for two hours. The solution then was cooled and evaporated under vacuum to about ¾ its original volume. Hydrochloric acid (6N) was added dropwise to this solution until precipitation was complete. The resulting precipitate was separated by filtration and dried to give 3.56 g. of crude A-35512B aglycone hydrochloride.

The filtrate was concentrated and analyzed. The filtrate contained glucose, fucose, mannose and rhamnose.

The crude A-35512B aglycone was purified by chromatography on acid-washed alumina (Woelm, Grade I), using a water:methanol (1:9) solvent system. Elution of the column was monitored by cellulose thin-layer chromatography. The eluted fractions containing A-35512B aglycone were combined and evaporated under vacuum to give 398 mg. of partially-purified product. Comparison thin-layer chromatographic results, using a ninhydrin spray for detection, confirmed that non-bioactive impurities were still present.

A portion of this partially-purified A-35512B aglycone (100 mg) was further purified by chromatography over polyamide (4 g; Machery, Nagel & Co.MN-SC-6, distributed by Brinkmann Instruments Co.; <0.07 mm), eluting with water. This column was also monitored by cellulose thin-layer chromatography as earlier described. The eluted fractions containing A-35512B aglycone were combined and lyophilized to give 64 mg. of purified A-35512B aglycone hydrochloride. (Total yield of 5.08% from starting A-35512 factor B).

EXAMPLE 5

Preparation of A-35512B Aglycone Free Base

A-35512B aglycone hydrochloride (90 mg), obtained as described in Example 4, was dissolved in 30 ml of methanol-water (1:1). This solution was neutralized with ion-exchange resin [3.5 ml, Bio-Rad AG-3-4X (OH$^-$)]. The resulting solution was stirred for 15 minutes at room temperature. The resin was then removed by filtration. The filtrate was concentrated under vacuum, maintaining the temperature at less than 60° C., to about half volume, and then lyophilized to give 68 mg of A-35512B aglycone free base.

I claim:

1. A-35512B aglycone, which in its hydrochloride form is a white amorphous compound having these characteristics:
  a. an approximate elemental composition of 54.29 percent carbon, 4.34 percent hydrogen, 7.40 percent nitrogen, 28.95 percent oxygen, and 5.02 percent chlorine;
  b. an infrared absorption spectrum in Nujol mull with significant absorption maxima at the following frequencies (cm$^{-1}$): 3440 (shoulder), 3340 (shoulder), 3215 (strong), 2950 (shoulder), 2910 (strong), 2840 (strong), 2640 (shoulder), 1735 (weak), 1655 (strong), 1590 (medium), 1500 (strong), 1460 (strong), 1378 (medium), 1365 (shoulder), 1298 (medium), 1215 (medium), 1155 (medium), 1120 (shoulder), 1105 (weak), 1060 (weak), 1040 (weak), 1008 (medium), 925 (weak), 875 (weak), 765 (shoulder), and 718 (weak);
  c. ultraviolet absorption spectra, in acidic and neutral methanol, with an absorption maximum at 282 nm ($E_{1cm}^{1\%}$ 102.62) and, in basic methanol, an absorption maximum at 302 nm ($E_{1cm}^{1\%}$ 182.09);
  d. a molecular weight of about 1282, as determined by titration;
  e. three titratable groups in 66% aqueous dimethylformamide with p$K_a$ values of approximately 7.5, 9.25, and 11.0;
  f. the following specific rotations:
  $[\alpha]_D^{25}$ −178° (c 5, CH$_3$OH)
  $[\alpha]_{365}^{25}$ −716.8° (c 5, CH$_3$OH).
  g. is soluble in water and methanol, but is insoluble in benzene, chloroform, acetone, diethyl ether, ethyl acetate, toluene, hexane, acetonitrile and dioxane;
  h. an amino-acid analysis indicating the presence of at least four amino-acid residues:
  i. an $R_f$ value of approximately 0.80 on cellulose thin-layer chromatography (aluminum support) in a 1-butanol:pyridine-acetic acid:water (15:10:3:12) solvent system, using *Sarcina lutea* as the detection organism;
  j. an $R_f$ value of approximately 0.26 on silica gel thin-layer chromatography, in a methanol: chloroform-conc.NH$_4$OH (3:2:1) solvent system;
  k. a $^{13}$C nuclear-magnetic-resonance spectrum in (methyl sulfoxide)-d$_6$ with the following characteristics:

| No. | PPM | Height (%) |
|---|---|---|
| 1 | 187.8 | 37.2 |
| 2 | 172.0 | 40.9 |
| 3 | 170.7 | 45.2 |
| 4 | 170.1 | 46.9 |
| 5 | 169.6 | 47.7 |
| 6 | 168.4 | 57.6 |
| 7 | 166.7 | 52.5 |
| 8 | 157.4 | 49.9 |
| 9 | 156.6 | 45.5 |
| 10 | 155.7 | 55.8 |
| 11 | 155.6 | 71.5 |
| 12 | 155.4 | 56.7 |
| 13 | 154.5 | 50.5 |
| 14 | 149.3 | 43.0 |
| 15 | 138.8 | 38.8 |
| 16 | 136.9 | 54.3 |
| 17 | 136.3 | 40.2 |
| 18 | 135.2 | 31.7 |
| 19 | 134.7 | 28.4 |
| 20 | 133.8 | 40.9 |
| 21 | 128.2 | 102.9 |
| 22 | 126.2 | 77.2 |
| 23 | 123.0 | 57.5 |
| 24 | 121.3 | 38.1 |
| 25 | 117.7 | 44.4 |
| 26 | 117.0 | 31.5 |
| 27 | 108.6 | 31.0 |
| 28 | 106.7 | 47.9 |
| 29 | 105.7 | 81.2 |
| 30 | 103.2 | 26.5 |
| 31 | 93.6 | 33.4 |
| 32 | 74.9 | 39.8 |
| 33 | 71.8 | 33.9 |
| 34 | 68.9 | 40.2 |
| 35 | 63.2 | 43.1 |
| 36 | 60.4 | 33.6 |
| 37 | 57.1 | 57.8 |
| 38 | 55.2 | 33.1 |
| 39 | 53.2 | 30.1 |
| 40 | 51.8 | 36.0 |
| 44 | 23.8 | 55.7 |
| 45 | 17.1 | 47.8 |
| 46 | 0.0 | 43.7 | l. contains a 3-amino-2,3,6-trideoxy-3-C-methyl-L-xylo-hexopyranose moiety;
  m. has at least one hydroxyl group capable of esterification;

and which in its free-base form is a white amorphous compound having these characteristics:
  a'. an approximate elemental composition of 52.65% carbon, 4.57% hydrogen, 6.91% nitrogen, 27.04% oxygen, and 2.94% chlorine;
  b'. an infrared absorption spectrum in KBr pellet with significant absorption maxima at the following frequencies (cm$^{-1}$): 3360 (strong), 3260 (shoulder), 2940 (shoulder), 1735 (shoulder), 1660 (strong), 1598 (medium), 1510 (strong), 1440 (medium), 1295 (weak), 1215 (medium), 1165 (medium), 1122 (weak), 1070 (weak), 1018 (strong), 940 (weak), and 920 (weak);
  c'. ultraviolet absorption spectra with an absorption maximum, in acidic and neutral methanol, at 282 nm ($E_{1cm}^{1\%}$ 43.65) and, in basic methanol, at 301 nm ($E_{1cm}^{1\%}$ 67.46);

d'. five titratable groups in 66% aqueous dimethylformamide with $pK_a$ values of approximately 6.2, 8.2, 10.1, 11.4, and 12.4;

e'. the following specific rotation: $[\alpha]_D^{25}$ −64.5° (c 3, methyl sulfoxide);

or a pharmaceutically-acceptable acid-addition salt of A-35512B aglycone.

2. The compound of claim 1 which is A-35512B aglycone hydrochloride.

* * * * *